Aug. 28, 1951 N. F. AGNEW 2,566,106

EMERGENCY COMMUNICATION SYSTEM PARTICULARLY FOR MINES

Filed Dec. 9, 1947

INVENTOR
NORMAN F. AGNEW
By his attorneys
Stebbins, Blenko & Webb

Patented Aug. 28, 1951 2,566,106

UNITED STATES PATENT OFFICE 2,566,106

EMERGENCY COMMUNICATION SYSTEM, PARTICULARLY FOR MINES

Norman F. Agnew, Penn Township, Allegheny County, Pa., assignor to Farmers Engineering & Manufacturing Co., Pittsburgh, Pa., a partnership consisting of Norman F. Agnew and Willard P. Place Application December 9, 1947, Serial No. 790,489

4 Claims. (Cl. 179—2)

Figure 1:
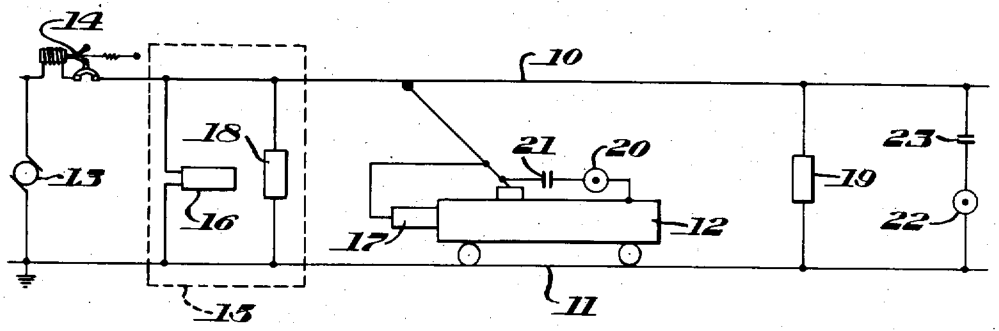

This invention relates to a communication system for installation in conjunction with an electric railway. It is particularly adapted for providing emergency service in mines.

Until recently, there has been no improvement in mine communication systems for many years. Conventional telephone systems have been used extensively but are subject to the difficulty of reaching fixed points underground and the dangers of circuit interruption caused by slate falls, the telephone wire being the most fragile conductor in the mine. While carrier-current systems using the rail and trolley of the electric railway usually installed in mines were tried several years ago, they were not successful because of the noise created by the motors of locomotives and auxiliaries, until frequency-modulation was adopted recently. Such systems are now operating very satisfactorily utilizing direct current from the same source which supplies the railway, but are rendered useless by failure of the normal power supply. Standby batteries could be employed as an emergency power supply but they would be costly because of the amount of power required. As a result, it has been the practice, where frequency-modulated carrier-current has been used for normal communication to provide an ordinary telephone system for emergency service, in order to comply with safety requirements, despite the considerable cost thereof and the danger of failure because of circuit interruption mentioned above.

My invention provides emergency communication in mines without the necessity of special telephone circuits, thereby eliminating the cost and maintenance thereof as well as the ever-present hazard of breakage. In a preferred embodiment, I employ emergency telephone equipment connected to the railway circuit consisting of the trolley and rails of the mine hauling system for use when the power supply has failed or been disconnected. Such equipment includes a novel transmitter-receiver including an amplifier and a single switch therefor whereby incoming signals are delivered by an electro-magnetic speaker and the latter serves as a microphone on operation of the switch for picking up and transmitting words spoken thereinto. Preferably a complete transmitter-receiver unit with local battery is located outside the mine and at one or more points within the mine. The units are capacitively connected to the trolley or other feeders. Each mine locomotive is preferably provided with a receiver capacitively connected to the trolley permitting the locomotive driver to receive instructions from any transmitter-receiver. The emergency equipment cannot be used when power is on the railway trolley because of the noise existing as aforesaid but, as soon as the power supply fails or is disconnected, the emergency equipment is ready for use, this being made possible by elimination of the noise as a result of stoppage of the motors connected to the power circuit supplying the locomotives and auxiliaries as well.

A complete understanding of the invention may be obtained from the following detailed description and explanation which refer to the accompanying drawings. In the drawings, Figure 1 shows diagrammatically the general arrangement of a form of my invention which is suitable for use in a mine; and Figure 2 is a circuit diagram of the transmitter-receiver.

Figure 2:
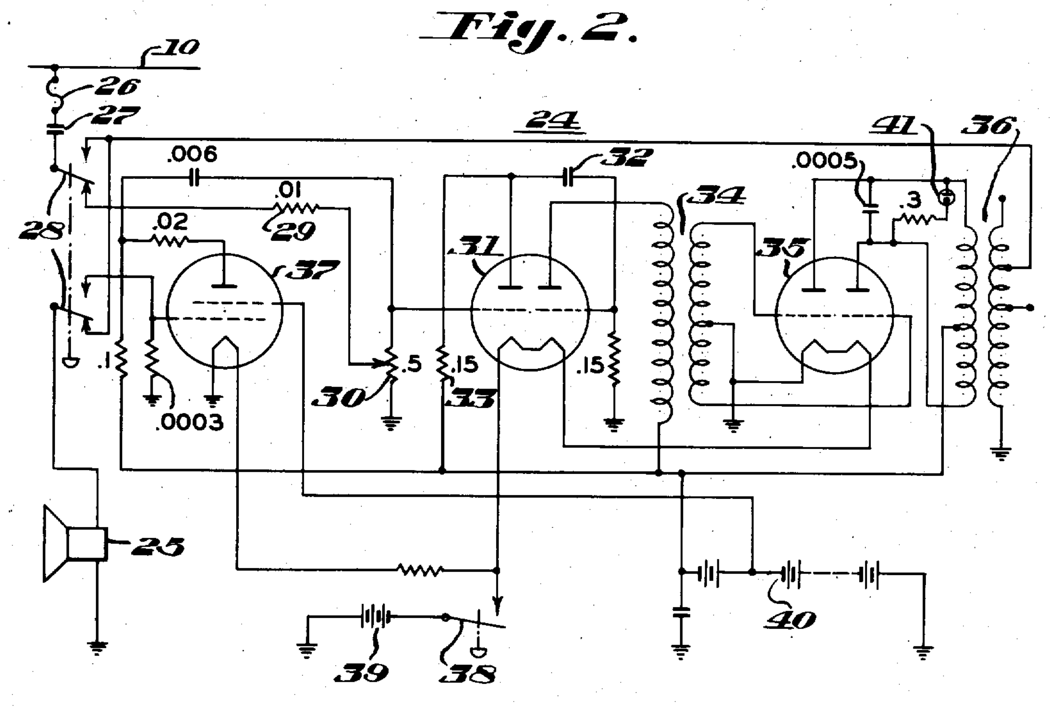

Referring in detail to the drawings, and for the present to Figure 1, an electric railway such as that usually installed in a mine comprises a trolley or other feeder 10 and rails 11 on which haulage locomotives such as that indicated at 12 travel. Power is supplied to the trolley from a generator 13 or other power source through a main circuit breaker 14. At the outside office 15 is located a frequency-modulated carrier-current transmitter-receiver 16 operated by power from trolley 10 for communication while the power is on. Each mine locomotive is equipped with a similar transmitter-receiver 17. Such a transmitter-receiver is described in a copending patent application Serial No. 713,252, filed November 30, 1946, now abandoned, by Willard P. Place.

An emergency battery-operated transmitter-receiver 18 is also located in the office 15 and a similar unit 19 at one or more points in the mine. The locomotive 12 has an ordinary telephone receiver 20 connected to the trolley through a capacity 21 which enables the driver to hear from both the transmitter-receiver units 18 and 19. Additional receivers 22 may be installed at the working face and connected to the trolley through capacitors 23.

The transmitter-receivers 16 and 17 are employed for normal communication while the power is on the trolley 10. In case of failure of the power source 13 or opening of the circuit breaker 14, the units 18 and 19 provide communication between the office 15 and various points inside the mine, utilizing the power circuit while it is out of service for normal operations.

Figure 2 shows the details of the transmitter-receiver units 18 and 19. In this figure, the values of capacitors and resistors as shown are given in micro-farads and megohms respectively. Each unit consists of a battery-operated amplifier 24 and loudspeaker 25. It is so constructed as to be mounted in a case about six inches square and twelve inches high, and is a complete self-contained unit for sending and receiving audio signals over the trolley and rail circuit 10, 11. The case has a handle for convenient carrying and the apparatus needs only to be connected to the trolley and ground to be ready for use. The connection to the trolley 10 is made through a 1 ampere fuse 26, condenser 27, the upper back contact of a push-button switch 28, a resistor 29 and a volume-control resistor 30 to the grid of a double triode (1J6) amplifier tube 31.

Audio signals coming in over the trolley wire are thus amplified through the first section of the tube 31, which is resistance-coupled through capacity 32 and resistor 33 to the second section of this tube for further amplification. The output of this second section is delivered by a plate-to-grid interstage transformer 34 to the grids of the two sections of a second amplifier tube 35 similar to tube 31. This provides push-pull driving of the grids of the second tube. An output transformer 36 has its primary connected for push-pull operation across the plates of the second tube 35. The secondary of the output transformer is connected to the loudspeaker 25 through a second back contact of the switch 28.

When the switch 28 is operated, the loudspeaker 25 becomes a microphone delivering signals through its lower front contact into the grid of a pre-amplifier tetrode tube 37 (1N5-G). Operation of the switch also transfers the output-transformer secondary from the speaker to the trolley 10. The grid of the first amplifier tube 31 instead of being driven from the signal on the trolley wire as before, is then driven from the plate circuit of the preamplifier tube 37. In this manner, sound impinging on the loudspeaker is amplified through the tubes 31 and 35 in the same way that signals from the trolley 10 were amplified when receiving. Since the secondary of the output transformer is connected to the trolley, audio signals are impressed between the trolley and ground.

A single switch 38 in series with the filament-supply battery 39 is used for turning the unit on and off. There is no switch in circuit with the "B" battery 40 because, when the tube elements are cold, no plate current will flow. A neon lamp 41 placed across the primary of the output transformer 36 provides a means for testing both the "A" and "B" batteries in the unit. With the switch 38 turned on to energize the tube filaments, there is sufficient tube voltage developed when talking into the loudspeaker with the switch 28 operated, to energize the lamp to visible condition.

It will be apparent from the foregoing that the invention provides an emergency communication system for mines having several important advantages. In the first place, no special communication circuit is required since the power circuit is used for communication when out of service for power transmission. This circuit is the sturdiest physically of all those in the mine, is less subject to interruption by slate falls and is normally maintained in good working order at all times for the purpose of transmitting power. Reliability is thus practically assured. The cost of a system according to my invention is much less than that of a conventional telephone system with its own circuit, in one instance less than one-tenth as great. The battery power required for operation is small and the transmitter-receiver units may be made self-contained and readily portable.

Although I have disclosed a preferred embodiment of my invention, it will be understood that changes in the details shown may be made without departing from the spirit of the invention or the scope of the appended claims.

I claim:

1. An audio frequency receiver and transmitter adapted to be coupled to two conductors comprising a coupler for coupling the receiver and transmitter to one of the conductors for voice transmission, several stages of amplification said stages having a tube having a grid as the first stage of amplification and another tube having a grid as an intermediate stage of amplification, a loudspeaker, and two circuits selectively controlled by a multipole switch by completing the following connections: for receiving, connecting the coupler to the grid of the tube in the intermediate stage of amplification and the loudspeaker to the output of the last stage of amplification and for sending, connecting the coupler to the output of the last stage of amplification and the loudspeaker to the grid of the tube in the first stage of amplification.

2. An audio frequency receiver and transmitter as described in claim 1 in which the last stage of amplification includes an output transformer and a neon lamp connected across the primary of the transformer.

3. A communication system for mines having an electric railway including power lines, said system comprising a carrier current communication circuit connected to said power lines for power and for signal transmission and an audio frequency receiver and transmitter having a separate source of power adapted to be coupled to said power lines for voice transmission, said audio frequency receiver and transmitter also having at least three stages of amplification, a power output transformer, a loudspeaker, and leads controlled by switching means for establishing separate circuits for receiving and for transmitting as follows: for receiving, connecting the loudspeaker to the output of the transformer and coupling an intermediate amplification stage to said conductors, for sending, connecting the loudspeaker to the first stage of amplification and coupling the transformer output to said conductors.

4. A communication system for mines having an electric railway including power lines, said system comprising a carrier current communication circuit connected to said power lines for power and for signal transmission and an audio frequency receiver and transmitter having a separate source of power adapted to be coupled to said power lines for voice transmission, several stages of amplification said stages having a tube having a grid as the first stage of amplification and another tube having a grid as an intermediate stage of amplification, a loudspeaker, and two circuits selectively controlled by a multipole switch by completing the following connections: for receiving, connecting the coupler to the grid of the tube in the intermediate stage of amplification and the loudspeaker to the output of the last stage of amplification and for sending, connecting the coupler to the output of the last stage of amplification and the loudspeaker to the grid of the tube in the first stage of amplification.

NORMAN F. AGNEW.

REFERENCES CITED

The following references are of record in the file of this patent:

UNITED STATES PATENTS

| Number | Name | Date |
|---|---|---|
| 766,502 | Kitsee | Aug. 2, 1904 |
| 1,043,526 | Lindal | Nov. 5, 1912 |
| 1,098,528 | Reineke | June 2, 1914 |
| 1,821,758 | Konn | Sept. 1, 1931 |
| 1,860,455 | Dietze | May 31, 1932 |
| 1,886,230 | Rowe | Nov. 1, 1932 |
| 2,054,933 | Frazier | Sept. 22, 1936 |
| 2,064,641 | Bossart | Dec. 15, 1936 |
| 2,137,023 | Monk | Nov. 15, 1938 |
| 2,142,874 | Sadowsky | Jan. 3, 1939 |
| 2,202,474 | Vroom | May 28, 1940 |
| 2,215,439 | Root | Sept. 17, 1940 |
| 2,269,144 | Campbell | Jan. 6, 1942 |
| 2,341,519 | Atkinson | Feb. 15, 1944 |
| 2,377,162 | Long | May 29, 1945 |
| 2,404,773 | Brown | July 30, 1946 |
| 2,430,471 | Lang | Nov. 11, 1947 |
| 2,453,269 | Rugh | Nov. 9, 1948 |

OTHER REFERENCES

Radio and Television News, August 1949, pp. 23–25, 120.

Certificate of Correction

Patent No. 2,566,106 August 28, 1951

NORMAN F. AGNEW

It is hereby certified that error appears in the printed specification of the above numbered patent requiring correction as follows:

Column 4, lines 16 and 17, strike out "for voice transmission" and insert the same in line 14, same column, after "conductors";

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*